(12) United States Patent
Pritchard

(10) Patent No.: US 6,494,655 B1
(45) Date of Patent: Dec. 17, 2002

(54) SELF-TAPPING SCREW AND METHOD FOR JOINING THIN WORKPIECES

(75) Inventor: Alan Pritchard, Almeria (ES)

(73) Assignee: Conti Fasteners AG, Barr (CH)

( * ) Notice: Subject to any disclaimer, the term of this patent is extended or adjusted under 35 U.S.C. 154(b) by 0 days.

(21) Appl. No.: 09/952,091

(22) Filed: Sep. 13, 2001

(51) Int. Cl.[7] ............................................. F16B 35/06
(52) U.S. Cl. ..................................... 411/399; 411/426
(58) Field of Search .................. 411/411, 412, 411/416, 424, 426, 386, 387.1, 387.4, 399, 423, 311

(56) References Cited

U.S. PATENT DOCUMENTS

| | | | | |
|---|---|---|---|---|
| 23,409 A | * | 3/1859 | Thom | 411/411 |
| 1,872,166 A | * | 8/1932 | Mulig | 411/423 |
| 3,812,639 A | * | 5/1974 | Sygnator | 411/161 |
| 3,949,641 A | | 4/1976 | Masuda | |
| 4,114,508 A | | 9/1978 | Jeal | |
| 5,061,135 A | | 10/1991 | Pritchard | |
| 5,183,359 A | * | 2/1993 | Barth | 411/161 |
| 5,252,016 A | * | 10/1993 | Schmid et al. | 411/386 |
| 5,456,685 A | * | 10/1995 | Huebner | 606/73 |
| 5,518,352 A | * | 5/1996 | Lieggi | 411/399 |
| 5,599,149 A | | 2/1997 | Clements | |
| 5,722,808 A | | 3/1998 | Pritchard | |
| 6,089,806 A | | 7/2000 | Reynolds et al. | |
| 6,158,939 A | * | 12/2000 | Grossberndt et al. | 411/411 |
| 6,319,270 B1 | * | 11/2001 | Grafton et al. | 606/232 |

OTHER PUBLICATIONS

U.S. pending patent application entitled, "Self–Tapping Screw, Blank and Method for Joining Thin Workpieces and Production Method for the Same" by Dennis O. Boyer and Alan Pritchard, filed Sep. 13, 2001. Atty. Docket No.: 104157–0070P1.

* cited by examiner

Primary Examiner—Flemming Saether
Assistant Examiner—Jori Schiffman
(74) Attorney, Agent, or Firm—Cesari and McKenna, LLP; William A. Loginov, Esq.

(57) ABSTRACT

A threaded self-tapping screw for joining thin workpieces having a tapered root portion adjacent to the head of the screw. A plurality of threads are disposed on the body and the tapered root portion of the screw such that the radial distance from the center of the screw to the crests of the threads is maintained along both the body and the tapered root portion.

23 Claims, 4 Drawing Sheets

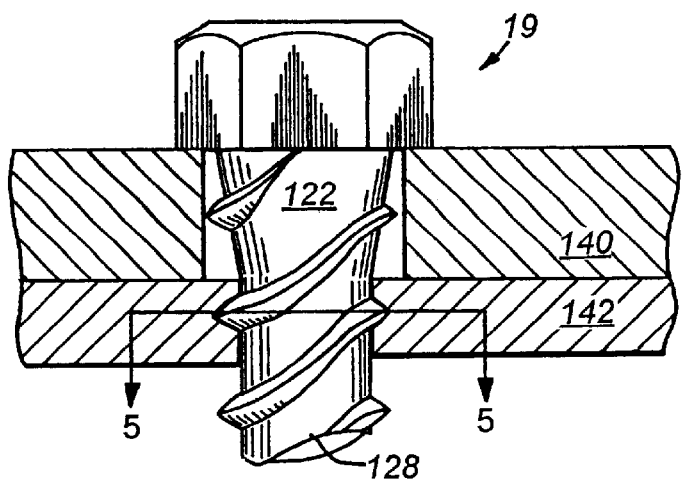
Fig. 4
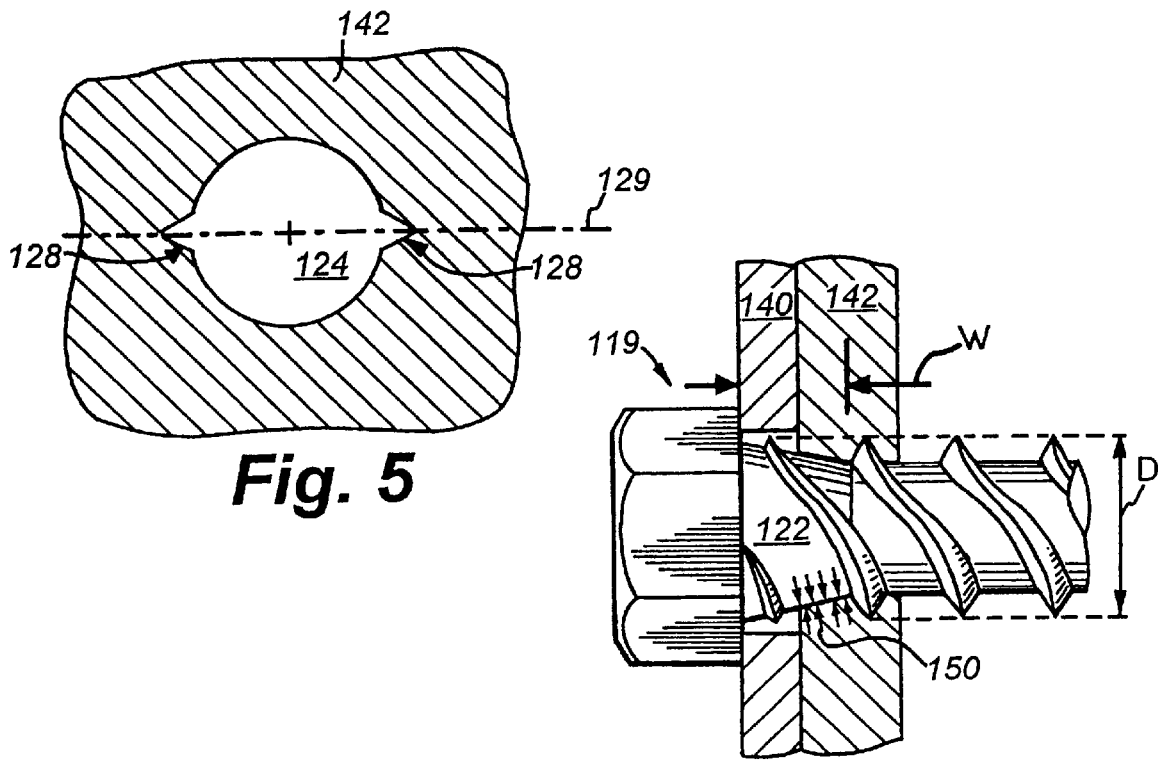
Fig. 5
Fig. 6

SELF-TAPPING SCREW AND METHOD FOR JOINING THIN WORKPIECES

RELATED APPLICATION

This application is related to U.S. patent application Ser. No. 09/952,157 entitled SELF-TAPPING SCREW, BLANK AND METHOD FOR JOINING THIN WORKPIECES AND PRODUCTION METHOD FOR SAME, by Alan Pritchard and Dennis Boyer, filed on even date.

FIELD OF THE INVENTION

This invention relates to self-tapping screws and methods to connect two or more pieces of thin sheet metal parts to form an assembly.

BACKGROUND OF THE INVENTION

It is recognized by those skilled in the art that conventional self-tapping screw products, when used to assemble thin sheet metal components, have limited reliability in service due to problems associated with a need to restrain the screw tightening torque to small relative values. This needed restraint on the tightening torque is required to minimize the potential for the anchor to strip during assembly and thereby cause the screw to spin. The anchor material is that part of the joined assembly farthest removed from the underside of the screw head. Stripping and spinning will cause a loss in assembly clamp load and subsequent deterioration of the assembly.

FIG. 1 shows a commonly encountered disadvantage of a self-tapping screw 11 that has a conventional single start thread used to join thin sheet metal components 12 and 16. When the screw anchor material 12, which is that furthest from the head of the screw, is of a width 15 equal to or less than the axial pitch 13 of the screw (defined generally herein as a "thin" workpiece), the leading face 14 of the scroll or thread will typically deflect the anchor material 12 such that the material follows the space between adjacent scrolls or threads. This type of anchor material and assembly may not produce the most effective joint clamping load. In addition, inadequate thread mating contact will result.

FIG. 2 shows another potential disadvantage associated with joining thin workpieces using prior art self-tapping screw implementations. The screw 110 maintains a parallel core diameter 111 as close as possible to the underside 112 of the screw head 113. This implementation can cause a reduction in the performance of the assembly. Manufacturing constraints generally create an under-filling of the screw thread crests adjacent to the underside 112 of the screw head 113, thereby creating an unspecified and non-controllable reverse thread taper 114. As such, the thread crests closer to the screw entry point are of a greater diametrical magnitude than the thread crests that are closer to the head. The reverse thread taper 114 has the disadvantage of producing a gap 115 between the internal and external mating threads of the assembly. This gap 115 has the effect of reducing mating thread contact in the essential area of the jointed structure and will result in assembly break down under lower than expected application torque.

It is therefore an object of this invention to provide for a self-tapping screw, and associated joining/fastening method, for connecting a plurality of thin pieces of sheet metal parts that prevents anchor material deflection during the screw assembly and tightening process. A further objective is to ensure that there is minimized any gaps that have previously occurred between the external threads on the screw and the internal threads generated in the anchor material by the self-tapping screw assembly and tightening process.

SUMMARY OF THE INVENTION

A self-tapping screw, and associated method, for joining thin work that over-comes the disadvantages of the prior art by providing a tapered root portion of the screw thread root adjacent to the head of the screw that assists in effectively drawing together the thin sheet metal parts of an assembly and additionally developing compressive forces at the interference of the tapered root portion and the anchor material.

The self-tapping screw, in accordance with one embodiment, is additionally provided with scrolls, or screw threads that are of multiple lead threads so that the potential for the screw anchor material to deflect and follow the gaps between adjacent threads on the screw during the assembly and tightening process is eliminated.

In another embodiment, the crest of the threads that are generated on the tapered screw root portion are of the same diametrical magnitude as are the crests of the threads on the body of the screw. In a preferred embodiment, the size diametrical magnitude of the screw thread crests are maintained for a distance that is commensurate with—the start of the screw lead tapered entry portion. The tapered root portion that is adjacent to the underside of the screw head should have an axial length of 2, and preferably no more than 3.5 times that of the axial pitch of the screw thread.

When used to fasten two objects, which are constructed of thin sheet metal work-pieces, the tapered root portion provides resistance to mating thread failure under applied torque by increasing the surface friction that is developed from the compressive forces at the interference with the screw anchor material. The combination of the tapered root portion interference and maintaining a full crest diameter up to the underside of the screw head enhances the ability of the system to resist failure during assembly and service.

BRIEF DESCRIPTION OF THE DRAWINGS

The foregoing and other objects and advantages of the invention will become clearer with reference to the following detailed description as illustrated by the drawings in which:

FIG. 4 is a partial side cross-section showing a screw in accordance with this invention joining a plurality of workpieces;

FIG. 5 is a cross-sectional view of the screw taken along line 5—5 of FIG. 4;

FIG. 6 is a partial side cross-section showing a screw joining two thin workpieces according to an embodiment of this invention;

DETAILED DESCRIPTION OF THE ILLUSTRATIVE EMBODIMENTS

Figure 1:
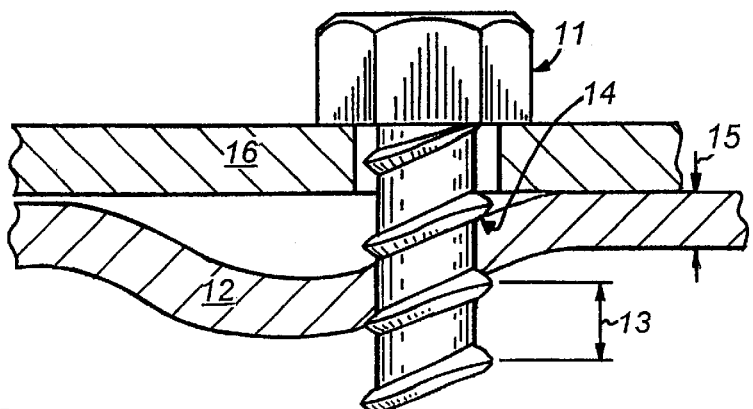
FIG. 1, already described, is a partial side cross section showing an example of anchor material deflection when using a conventional single-lead-helical-thread on a screw.
Figure 2:
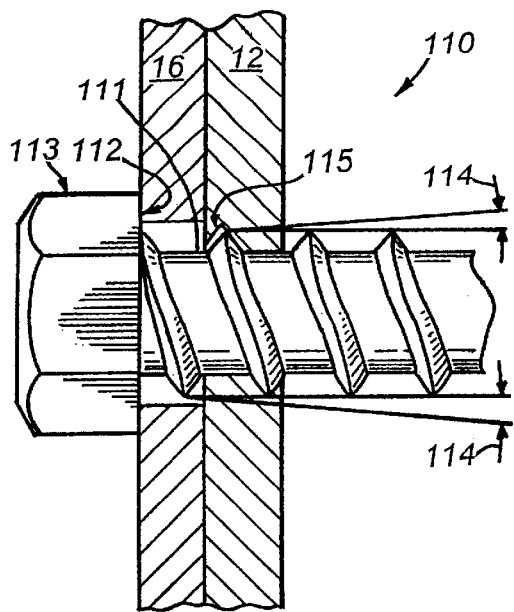
FIG. 2, already described, is a partial side cross-section showing the creation of a reverse-thread taper associated with manufacturing constraints by having a parallel screw thread root core diameter along the full length of a screw.
Figure 3:
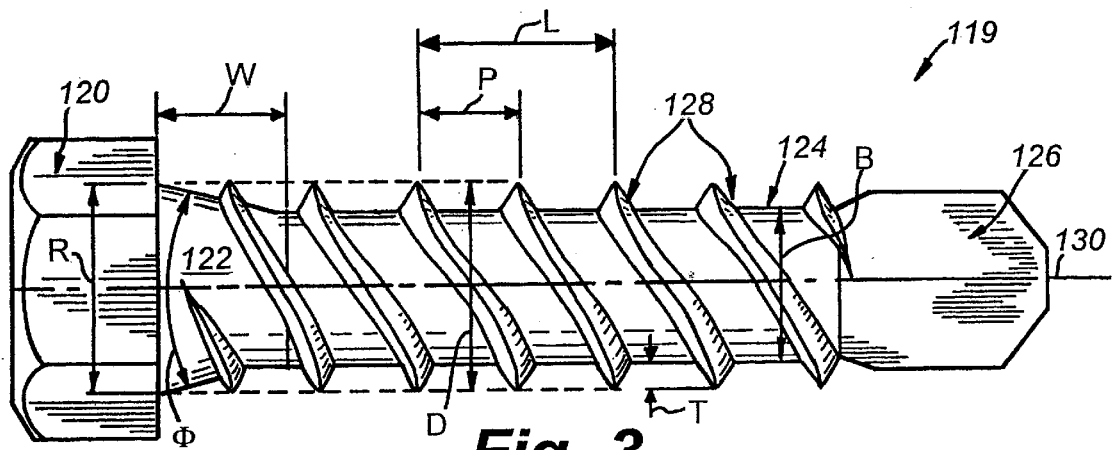
FIG. 3 is a side view of a screw in accordance with an embodiment of this invention, showing the tapered root portion.

FIG. 3 illustrates a screw 119 according to one embodiment of this invention. The screw includes a head 120, a tapered root portion 122 (tapering radially outwardly in a direction along the body taken toward the head 120), a body 124 and an entry point 126.

The screw head 120 may be of any desired shape, and may have (for example) a standard recessed cross slot, a Phillips style cruciform recess, a hexagon socket recess, a six-lobed formation, or may contain any other system that will allow torque to be transmitted to the screw through a suitable and appropriate wrenching system.

The cylindrical shaft or body of the screw 124 has disposed along its outer periphy, a plurality of continuous helical scrolls or threads 128. The body is of circular cross-section. The screw thread (helical scrolls) has an outer diameter D. In an embodiment the magnitude of D can lie within the range of 1.6–10 mm. However, this and other ranges specified herein are only exemplary of a typical application of the screw according to this invention. The principles described herein can be applied to screws, and corresponding materials, of any type and/or size.

In one illustrative embodiment, there are two separate continuous helical scrolls or threads disposed along the body 124, such that the screw is of a twin or double lead type, but it is expressly contemplated that other numbers of separate threads could be utilized. In this embodiment, the use of a plurality of threads works to further prevent anchor sheet deformation. Note that the term "thread" as used herein could refer to either the overall continuous formation or formations, winding helically along the cylindrical shaft or body, or the individual profile peak-and-valley formations on a cross section of the screw. The context in which the term is used should assist the reader in differentiating between the two uses of the general term.

The threads 128 have an axial pitch P, which is the distance between crests of adjacent threads. In one embodiment, the axial pitch P can lie within the range of 0.15–0.22 times the screw diameter D. The axial lead L of the thread is the distance between two adjacent crests of the same thread or scroll. In one embodiment, the axial lead L will be two times the axial pitch P when related to a twin lead thread. In instances of helical scrolls that are in excess of the twin lead of the illustrative embodiment (e.g. three or more scrolls), the axial lead L will equate to the axial pitch P times the number of separate threads (scrolls) that are determined as applicable for a specific design of the assembled product. For example, in a three-lead type screw, L=3×P. Threads 128 can be constructed in accordance with of a number of conventional and specialized thread profiles, which are further discussed below.

The screw, or a workpiece-engaging portion thereof, is constructed from a cylindrical blank that is rolled or otherwise formed to produce helical scrolls or threads of an appropriately selected profile geometry. The cylindrical blank includes a head, and adjacent to the head a desired tapered root portion that increases in magnitude from the body of the blank radially outward as the form approaches the head. The initial formation of this "headed blank" can be by use of conventional heading machines and suitably developed tooling, or by the use of turning lathes. The headed blank is constructed from heat treatable material that, when suitably treated, is capable of withstanding the application torque. Where necessary, the screw materials are treated so that they will be capable of withstanding (without failure) the applied torque when engages with specified anchor materials of a predetermined type. Such treatments can include Case hardening and/or induction point hardening.

The tapered root portion 122 of the screw, which is located axially between the head 120 and the parallel screw thread root 124 (which is generally within the "body" section or zone) of the screw, has an axial length W (see FIGS. 3 and 6, for example) of at least two, and preferably no more than approximately 3.5 times the axial pitch P. The tapered root portion 122 has a maximum diameter R adjacent to the head 120, tapering downward to a diameter equal to the screw thread root diameter B. Angle $\phi$ is the angle that the root taper portion 122 forms with respect to screw thread root 124. The angle $\phi$ should be between approximately 6° and 15°, preferably between 8° and 10°.

According to one embodiment, threads 128 are disposed on the tapered root portion 122, such that the outer diameter D of the screw and threads is of approximately the same magnitude along the tapered root portion 122 and the zone of the screw thread root 124. While it is sometimes preferable that all threads between the head (including the tapered root portion) and the entry point region be of approximately the same outer diameter, it is contemplated that alternate embodiments may employ a different thread diameter and profile in a region closer to the entry point and more remote from the tapered root portion to derive certain beneficial effects in connection with specific workpiece thickness and materials. Accordingly, it is contemplated that the threads have approximately the same diameter in the tapered root portion and a part of the screw body directly adjacent the tapered root portion (the adjacent part extending from the tapered root portion for at least a distance of four times the thread pitch toward the entry point).

The entry point 126 can be any type of screw entry point. In one embodiment, the entry point is in accordance with an entry point used for a self drilling and tapping screw. In another embodiment, the entry point is in accordance with the usual tapered lead entry point associated with self-tapping screws. It should be noted that it is expressly contemplated that the entry point 126 can take other forms.

FIG. 4 shows a screw 119 in accordance with this invention joining a first work-piece 140 and a second workpiece 142. As shown, the threads 128 are disposed on the screw such that the cross-section line 5—5 intersects a plurality of threads as shown in FIG. 5. In this illustrative embodiment, two diametrically opposed threads 128 (through screw centerline 129) engage the workpiece. The use of the plurality of threads acts to counter forces that can cause thin sheet anchor deflection. These counter forces provide for good mating thread contact that reduces the probability of thread stripping or screw spinning.

FIG. 6 is another view of a screw 119 joining two thin workpieces 140 and 142. The tapered root portion 122 creates additional compressive forces 150 along the zone where the tapered root portion 122 is in contact with the anchor material 142.

The combination of the additional compressive forces 150 from the tapered root portion 122, along with maintaining a constant outer diameter D along the body and tapered root portion of the screw, provides for a screw that, when used to join thin work-pieces, produces a stronger assembly. This combination of compressive forces 150, a constant outer diameter D and a plurality of threads, provides for a screw that prevents anchor material deflection, does not produce a reverse thread taper or gaps between threads and the anchor material, and reduces the likelihood of stripping and spinning.

FIGS. 7–11 show various thread profiles that can be implemented on threads 128 of the screw in various embodiments of this invention. It should be noted that the invention is not limited to the use of any of these illustrative thread profiles. It is expressly contemplated that any thread profile acceptable for a self-tapping screw may be used in accordance with this invention.

Figure 7:
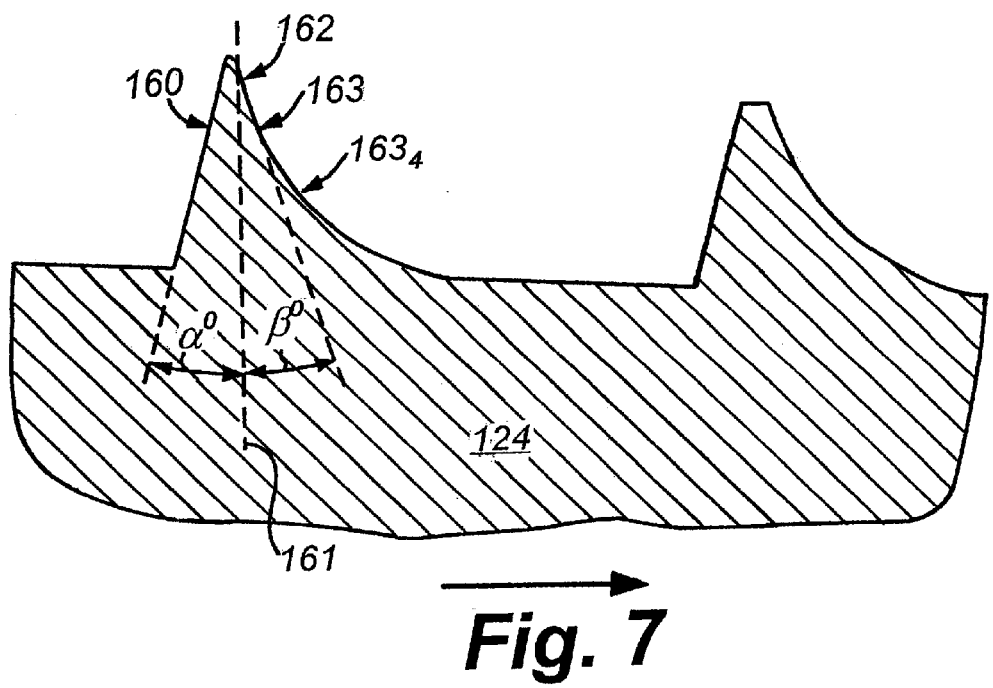
FIG. 7 is a cross-sectional view showing a trailing face thread profile.

FIG. 7 shows a trailing-thread-face profile as described in U.S. Pat. No. 5,061,135 granted to Pritchard, which is hereby incorporated by reference. The trailing face 160 of the thread profile (that being farthest away from the screw entry point on each sectioned profile) is angled in relation to an imaginary line 161 perpendicular to the axis of rotation by $\alpha°$. The preferred magnitude of this angle is 15°, although it may lie. within 10°–15°. A tip 162 of the leading face 163 of the screw thread profile is angled relative to the perpendicular line by $\beta°$. The preferred value of $\beta$ is 20°, although it may lie within 17° to 25°. The magnitude of the radius of the curved section 163a of the leading face 163 is preferably 0.22 times the screw outer diameter D, but may lie within the range of 0.22–0.3 times the screw outer diameter D. The tip 162 may be truncated.

Figure 8:
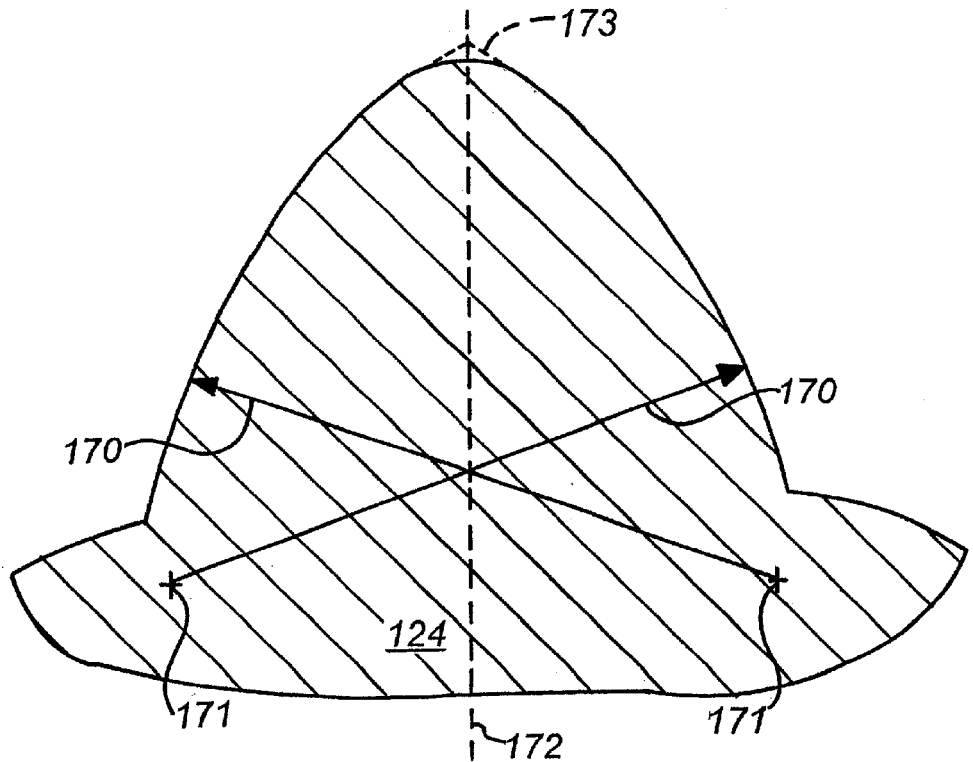
FIG. 8 is a cross-sectional view showing a radius thread profile that can be used in accordance with this invention.

FIG. 8 shows a radius profile thread as described in U.S. Pat. No. 5,722,808 also granted to Pritchard, which is hereby incorporated by reference. The profile of the radius thread is developed from radii 170 that are struck from centers 171 such that the profile is symmetric about an imaginary centerline 1172. The magnitude of the radii 170 and the positioning of the centers 171 are developed with reference to the relationship between known, current minimum and maximum metal (or "material") conditions of the screw thread as per the teaching of the incorporated '808 patent. The tip 173 of the thread profile may be truncated.

Figure 9:
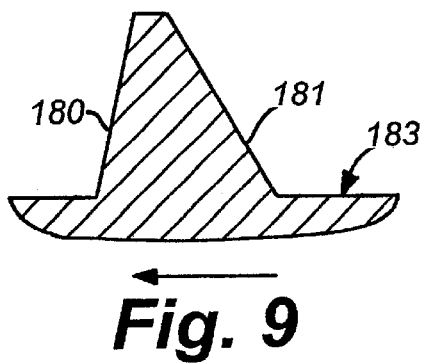
FIG. 9 is a cross-sectional view showing a trapezoidal thread according to one embodiment.
Figure 10:
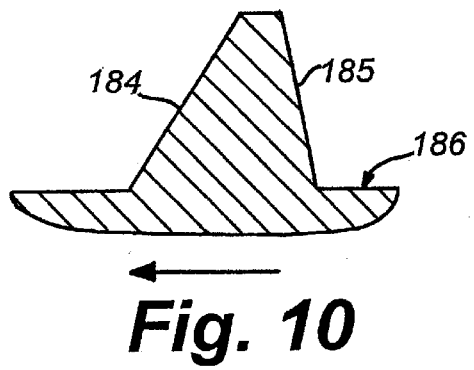
FIG. 10 is a cross-sectional view showing a trapezoidal thread according to another embodiment.
Figure 11:
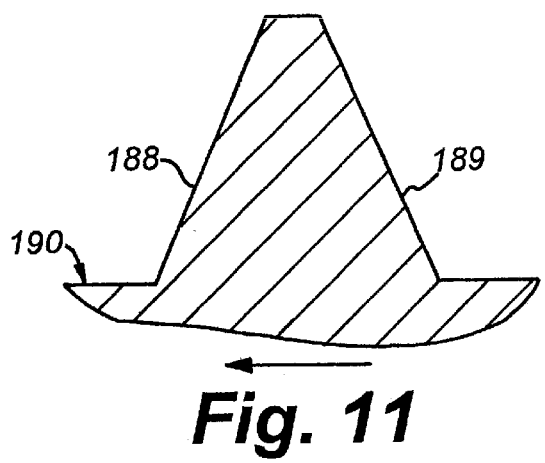
FIG. 11 is a cross-sectional view showing a trapezoidal thread according to another embodiment.

FIGS. 9–11 show a plurality of traditional trapezoidal thread profiles. FIG. 9 shows a trapezoidal thread profile where the leading face 180 has a steeper (e.g. closer to perpendicular) angle with respect to the parallel root 183 than the trailing face 181. FIG. 10 shows the converse, wherein the trailing face 185 has is steeper with respect to the parallel root 186 than the leading face 184. FIG. 11 shows a trapezoidal thread profile wherein both the trailing 188 and leading 189 faces have substantially similar angles with respect to the parallel root 190.

Figure 12:
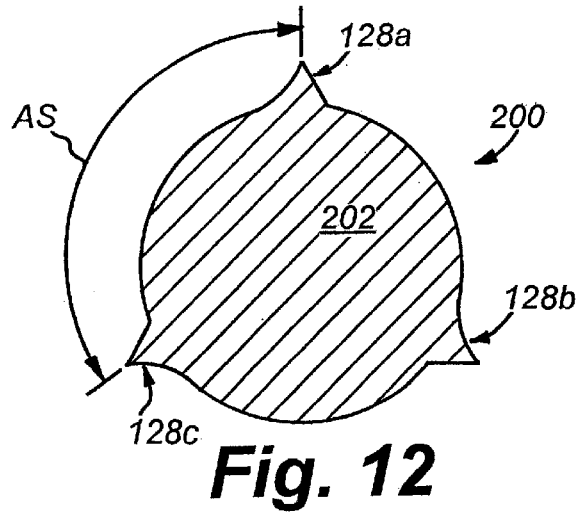
FIG. 12 is a cross-sectional view showing three helical threads.

According to an alternate embodiment, the screw can have three, four, or more, separate continuous lead threads or scrolls. FIG. 12 is a cross-sectional view of an illustrative screw 200 with three separate continuous lead threads 128a, 128b and 128c formed along its body 202, and terminating in the tapered root section at the head (not shown). This arrangement provides further hold stability for many workpiece materials of varying thickness. Note that each separate lead thread 128a, 128b and 128c is spaced by an equal angle AS that is 120 degrees with respect to adjacent lead threads. For an equal spacing of lead threads, the angle AS will eqiual the number of 360 degrees divided by the number of lead threads.

The foregoing has been a detailed description of certain embodiments of the invention. Various modifications and additions can be made without departing from the spirit and scope thereof. For example, the particular type of the self-tapping thread design (thread cutting or roll-forming), the number continuous helical scrolls or threads, and the like can be varied. Likewise the materials and hardness of the screw, as well as the material of the underlying anchor sheet can be varied. Accordingly, this description is meant to be taken only by way of example, and not to otherwise limit the scope of the invention.

What is claimed is:

1. A self-tapping screw for joining thin workpieces having a direction of extension along an axial direction and an axis of rotation extending along the axial direction and a head, the workpieces including a first workpiece adjacent to the head and a second workpiece overlying the first workpiece remote from the head, the second workpiece defining a thin anchor material remote from the head, the screw comprising:

a tapered root portion adjacent to the head, the head extending outwardly, about a perimeter thereof, from the axis of rotation further tan a maximum extension of the tapered root portion from the axis of rotation so as to to overlie the first workpiece with the tapered root portion extending axially through the first workpiece;

a screw body extending in the axial direction;

a plurality of threads having a set thread profile disposed along the screw body and along the tapered root portion such that a constant radial distance from the axis of rotation to a crest of each of the threads is maintained along both the tapered root portion and at least a portion of the screw body adjacent to the tapered root portion, so that, when the screw body extends axially through the second workpiece the threads engage the second workpiece so as to cause the second workpiece to apply compressive forces against the first workpiece and the head.

2. The self-tapping screw in claim 1, wherein a distance between crests of adjacent threads measured along the axis of rotation define an axial pitch and the tapered root portion has a length of at least twice the axial pitch.

3. The self-tapping screw of claim 1, wherein a distance between crests of adjacent threads measured along the axis of rotation define an axial pitch and the tapered root portion has a length of no more than 3.5 times the axial pitch.

4. The self-tapping screw of claim 1, wherein a distance between crests of adjacent threads measured along the axis of rotation define an axial pitch, and the tapered root portion has a length in the range of 2–3.5 times the axial pitch.

5. The self-tapping screw of claim 1, wherein a distance between crests of adjacent threads measured along the axis of rotation define an axial pitch;

a distance between crests of the same thread measured along the axis of rotation define an axial lead; and the axial lead is at least twice the axial pitch.

6. The self-tapping screw of claim 1, wherein the plurality of the threads are defined by two separate continuous helical threads along the screw body.

7. The self-tapping screw of claim 1, wherein the plurality of the threads are defined by three separate continuous helical threads along the screw body.

8. The self-tapping screw of claim 1, wherein the plurality of the threads are defined by four separate continuous helical threads along the screw body.

9. The self-tapping screw of claim 1, wherein the thread profile is a trailing face thread profile.

10. The self-tapping screw of claim 1, wherein the thread profile is a radius thread profile.

11. The self-tapping screw of claim 1, wherein the thread profile is of a trapezoidal geometry.

12. The self-tapping screw of claim 1, wherein the screw body includes an entry point that is a self-drilling and self-tapping entry point.

13. The self-tapping screw of claim 1, wherein the screw body includes an entry point that is a tapered-lead entry formation.

14. The self-tapping screw in claim 1 further comprising an entry point located at an end of the screw body opposite the head, and wherein the plurality of threads having the set thread profile disposed along the screw body and along the tapered root portion is such that the constant radial distance from the axis of rotation to the crest of each of the threads is maintained along both the tapered root portion and the screw body between the tapered root portion and the entry point.

15. A self-tapping screw for joining thin workpieces having a direction of extension along an axial direction and an axis of rotation and a head, the workpieces including a first workpiece adjacent to the head and a second workpiece overlying the first work-piece remote from the head, the second workpiece defining a thin anchor material remote from the head, the screw comprising:
    a tapered root portion adjacent to the head, the head extending outwardly, about a perimeter thereof, from the axis of rotation farther than a maximum extension of the tapered root portion from the axis of rotation so as to to overlie the first workpiece with the tapered root portion extending axially through the first workpiece;
    a screw body extending in the axial direction;
    three or more discrete threads each having a set thread profile disposed along the screw body and along the tapered root portion such that a constant radial distance from the axis of rotation to a crest of each of the threads is maintained along both the tapered root portion and at least a portion of the screw body adjacent to the tapered root portion, so that, when the screw body extends axially through the second workpiece the threads engage the second workpiece so as to cause the second workpiece to apply compressive forces against the first workpiece and the head.

16. The self-tapping screw in claim 15 further comprising an entry point located at an end of the screw body opposite the head, and wherein the plurality of threads having the set thread profile disposed along the screw body and along the tapered root portion is such that the constant radial distance from the axis of rotation to the crest of each of the threads is maintained along both the tapered root portion and the screw body between the tapered root portion and the entry point.

17. The self-tapping screw in claim 15, wherein a distance between crests of adjacent threads measured along the axis of rotation define an axial pitch and the tapered root portion has a length of at least twice the axial pitch.

18. The self-tapping screw of claim 15, wherein a distance between crests of adjacent threads measured along the axis of rotation define an axial pitch and the tapered root portion has a length of no more than 3.5 times the axial pitch.

19. The self-tapping screw of claim 15, wherein a distance between crests of adjacent threads measured along the axis of rotation define an axial pitch, and the tapered root portion has a length in the range of 2–3.5 times the axial pitch.

20. The self-tapping screw of claim 15, wherein a distance between crests of adjacent threads measured along the axis of rotation define an axial pitch;
    a distance between crests of the same thread measured along the axis of rotation define an axial lead; and
    the axial lead is at least twice the axial pitch.

21. A method for joining thin workpieces using a threaded self-tapping screw having a direction of extension along an axial direction and an axis of rotation and comprising a tapered root portion adjacent to a head, the head extending outwardly, about a perimeter thereof, from the axis of rotation further than a maximum extension of the tapered root portion from the axis of rotation, the workpieces including a first workpiece adjacent to the head and a second workpiece overlying the first workpiece remote from the head, the second workpiece defining a thin anchor material remote from the head, the screw further including a screw body, a plurality of threads having a set thread profile disposed along the screw body and along the tapered root portion such that a constant radial distance from the axis of rotation to a crest of each of the threads is maintained along both the tapered root portion and at least a portion of the screw body adjacent to the tapered root portion, the method comprising the steps of:
    rotating the screw while applying pressure along the axis of rotation in the direction of the workpieces so that the screw extends in the axial direction through the first workpiece and the second workpiece in a manner that brings the head into overlying engagement with the first workpiece;
    providing countering forces from the plurality of threads to prevent anchor material deflection;
    providing compressive forces in the workpieces by engaging the threads with the second workpiece so as to force the second workpiece against the first workpiece and the head, where the workpieces have interference with the tapered root portion.

22. A method for joining thin workpieces using a threaded self-tapping screw having a direction of extension along an axial direction and an axis of rotation and comprising a tapered root portion adjacent to a head, the head extending outwardly, about a perimeter thereof, from the axis of rotation further than a maximum extension of the tapered root portion from the axis of rotation, the workpieces including a first workpiece adjacent to the head and a second workpiece overlying the first workpiece remote from the head, the second workpiece defining a thin anchor material remote from the head, the screw further including a screw body, a plurality of threads having a set thread profile disposed along the screw body and along the tapered root portion such that a constant radial distance from the axis of rotation to a crest of each of the threads is maintained along both the tapered toot portion and at least a portion of the screw body adjacent to the tapered root portion, the method comprising the steps of:
    rotating the screw while applying pressure along the axis of rotation in the direction of the workpieces so that the screw extends in the axial direction through the first workpiece and the second workpiece in a manner that brings the head into overlying engagement with the first workpiece;
    forming a series of internal threads by the threads disposed along the screw body;
    applying countering forces to substantially prevent anchor material deflection, the countering forces being created by the plurality of threads disposed along the screw body;
    applying compressive forces substantially perpendicular to the tapered root portion to the workpieces in contact with the tapered root portion by engaging the threads with the second workpiece so as to force the second workpiece against the first workpiece and the head, the compressive forces being created by along the surfaces where the tapered root portion has interference with the workpieces.

23. A method for joining thin workpieces using a threaded self-tapping screw having a direction of extension along an axial direction and an axis of rotation and comprising a tapered root portion adjacent to a head, the head extending outwardly, about a perimeter thereof, from the axis of rotation further than a maximum extension of the tapered root portion from the axis of rotation, the workpieces including a first workpiece adjacent to the head and a second workpieces overlying the first workpiece remote from the head, the second workpiece defining a thin anchor material remote from the head, the screw further including a screw body, a plurality of threads having a set thread profile disposed along the screw body and along the tapered root portion such that a constant radial distance from the axis of rotation to a crest of each of the threads is maintained along both the tapered root portion and at least a portion of the screw body adjacent to the tapered root portion, the method comprising the step of:

applying compressive forces substantially perpendicular to the tapered root portion to the workpieces in contact with the tapered root portion by engaging the threads with the second workpiece so as to force the second workpiece against the first workpiece and the head in the axial direction, the compressive forces being created where the tapered root portion has interference with the workpieces.

* * * * *